(12) United States Patent
Graham et al.

(10) Patent No.: US 12,710,540 B2
(45) Date of Patent: Aug. 18, 2026

(54) AUTONOMOUS SCANNING AND MAPPING SYSTEM

(71) Applicant: Universal City Studios LLC, Universal City, CA (US)

(72) Inventors: Martin Evan Graham, Clermont, FL (US); Patrick John Goergen, Orlando, FL (US); Stockwell Haines, Orlando, FL (US); Tomas Manuel Trujillo, Miami Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 1126 days.

(21) Appl. No.: 16/950,681

(22) Filed: Nov. 17, 2020

(65) Prior Publication Data

US 2021/0157004 A1 May 27, 2021

Related U.S. Application Data

(60) Provisional application No. 62/940,727, filed on Nov. 26, 2019.

(51) Int. Cl.
*G01S 17/894* (2020.01)

(52) U.S. Cl.
CPC .................................. *G01S 17/894* (2020.01)

(58) Field of Classification Search
CPC .................................................... G01S 17/894
See application file for complete search history.

(56) References Cited

U.S. PATENT DOCUMENTS 6,618,075 B2 9/2003 Tomita
7,583,275 B2 9/2009 Neumann et al.
(Continued)

FOREIGN PATENT DOCUMENTS

CN 109074082 A 12/2018
JP 2014186566 A 10/2014
(Continued)

OTHER PUBLICATIONS

PCT/US2020/061826 International Search Report and Written Opinion mailed Mar. 25, 2021.
(Continued)

*Primary Examiner* — Helal A Algahaim
*Assistant Examiner* — Clara G Chilton
(74) *Attorney, Agent, or Firm* — Fletcher Yoder, P.C.

(57) ABSTRACT

An amusement park attraction mapping system includes a sensing system configured to be disposed within an environment of an amusement park attraction, a positioning system coupled to the sensing system, and a controller communicatively coupled to the sensing system and the positioning system. The sensing system is configured to capture scanning data of the environment, and the scanning data includes virtual points representative of objects in the environment. The positioning system is configured to move the sensing system within the environment. Further, the controller is configured to determine target scanning data to be captured by the sensing system, output a first control signal to instruct the positioning system to move the sensing system to a target position based on the target scanning data, and output a second control signal to instruct the sensing system to capture the scanning data at the target position.

20 Claims, 5 Drawing Sheets

(56) References Cited

U.S. PATENT DOCUMENTS

| | | | |
|---|---|---|---|
| 7,920,251 | B2 | 4/2011 | Chung |
| 8,553,942 | B2 | 10/2013 | Lynch |
| 9,383,753 | B1 * | 7/2016 | Templeton ........... G05D 1/0246 |
| 9,817,848 | B2 | 11/2017 | McKinnon et al. |
| 9,946,076 | B2 | 4/2018 | Smits et al. |
| 10,077,984 | B2 | 9/2018 | Akselrod et al. |
| 10,106,153 | B1 * | 10/2018 | Xiao ...................... B62D 15/02 |
| 10,914,569 | B2 * | 2/2021 | Zweigle ................... B25J 5/007 |
| 2006/0293110 | A1 | 12/2006 | Mendelsohn |
| 2013/0100114 | A1 | 4/2013 | Lynch |
| 2016/0184719 | A1 | 6/2016 | D'Andrea et al. |
| 2017/0157521 | A1 | 6/2017 | Comploi |
| 2017/0200032 | A1 | 7/2017 | Sample et al. |
| 2018/0341040 | A1 * | 11/2018 | Cortelyou .......... G01N 21/8422 |
| 2019/0318539 | A1 | 10/2019 | Weston |
| 2019/0354282 | A1 | 11/2019 | Hall et al. |

FOREIGN PATENT DOCUMENTS

| | | | |
|---|---|---|---|
| JP | 2017097429 | A | 6/2017 |
| JP | 2019039247 | A * | 3/2019 |
| JP | 2019117446 | A | 7/2019 |
| WO | 2014145071 | A2 | 9/2014 |
| WO | 2016041088 | A1 | 3/2016 |
| WO | 2017215899 | A2 | 12/2017 |
| WO | 2018073878 | A1 | 4/2018 |
| WO | 2018144396 | A1 | 8/2018 |

OTHER PUBLICATIONS

JP Office Action for Japanese Application No. 2022-530898 mailed Aug. 29, 2024.

CN Office Action for Chinese Application No. 202080082061.0 mailed Mar. 31, 2025.

SG Office Action for Singapore Application No. 11202204472W mailed Mar. 14, 2025.

IN Office Action for Indian Application No. 202217034901 mailed Apr. 3, 2025.

* cited by examiner

AUTONOMOUS SCANNING AND MAPPING SYSTEM

CROSS REFERENCE TO RELATED APPLICATIONS

This application claims priority from and the benefit of U.S. Provisional Application Ser. No. 62/940,727, entitled "AUTONOMOUS SCANNING AND MAPPING SYSTEM", filed Nov. 26, 2019, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be understood that these statements are to be read in this light and not as admissions of prior art.

An amusement or theme park generally includes a variety of entertainment systems or attractions that each provides a unique experience for guests of the amusement park. For example, the amusement park may include different attraction systems, such as a roller coaster, a drop tower, a log flume, and so forth. Some attraction systems may include an environment that may have several different features, such as animated figures and special effects, which help immerse guests in the experience of the attraction system. However, installation and configuration of the features may be difficult. For example, it may be challenging to determine whether the features are positioned at desirable locations within the environment (e.g., relative to a path of travel of a ride vehicle) to provide a desirable effect or experience for the guests. Furthermore, as attraction systems become increasingly complex, coordination between various features of the attraction system are of high importance. Therefore, improved techniques to assess or evaluate the environment of an attraction system are desirable to determine whether features of the attraction system are desirably implemented.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an amusement park attraction mapping system includes a sensing system configured to be disposed within an environment of an amusement park attraction, a positioning system coupled to the sensing system, and a controller communicatively coupled to the sensing system and the positioning system. The sensing system is configured to capture scanning data of the environment, and the scanning data includes virtual points representative of objects in the environment. The positioning system is configured to move the sensing system within the environment. Further, the controller is configured to determine target scanning data to be captured by the sensing system, output a first control signal to instruct the positioning system to move the sensing system to a target position based on the target scanning data, and output a second control signal to instruct the sensing system to capture the scanning data at the target position.

In an embodiment, a controller for a scanning and mapping system of an amusement park includes a tangible, non-transitory, computer-readable medium having computer-executable instructions stored thereon that, when executed, are configured to cause one or more processors to determine target scanning data of an environment of the amusement park to be captured, in which the target scanning data comprises a target collection of virtual points. The instructions, when executed, are further configured to cause one or more processors to output a first control signal to a ride vehicle of the amusement park to move a sensing system to a target location within the amusement park based on the target scanning data, output a second control signal to a positioning system coupled to the ride vehicle to move the sensing system to a target position relative to the ride vehicle based on the target scanning data, and output a third control signal to the sensing system to capture scanning data at the target location and the target position.

In an embodiment, a theme park attraction system includes a ride vehicle, a sensing system configured to capture scanning data of an environment of a theme park attraction, a positioning system coupling the sensing system to the ride vehicle, and a controller communicatively coupled to the ride vehicle, the sensing system, and the positioning system. The scanning data includes data points representative of physical objects in the environment, and the positioning system is configured to move the sensing system relative to the ride vehicle. Further, the controller is configured to determine sets of target scanning data to be captured by the sensing system, instruct the ride vehicle and the positioning system to move the sensing system to a plurality of placements within the environment, in which each placement is associated with a set of target scanning data of the sets of target scanning data, instruct the sensing system to capture sets of scanning data, in which each set of scanning data of the sets of scanning data is associated with a respective placement of the plurality of placements, and combine the sets of scanning data with one another to create a data point cloud of the environment.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
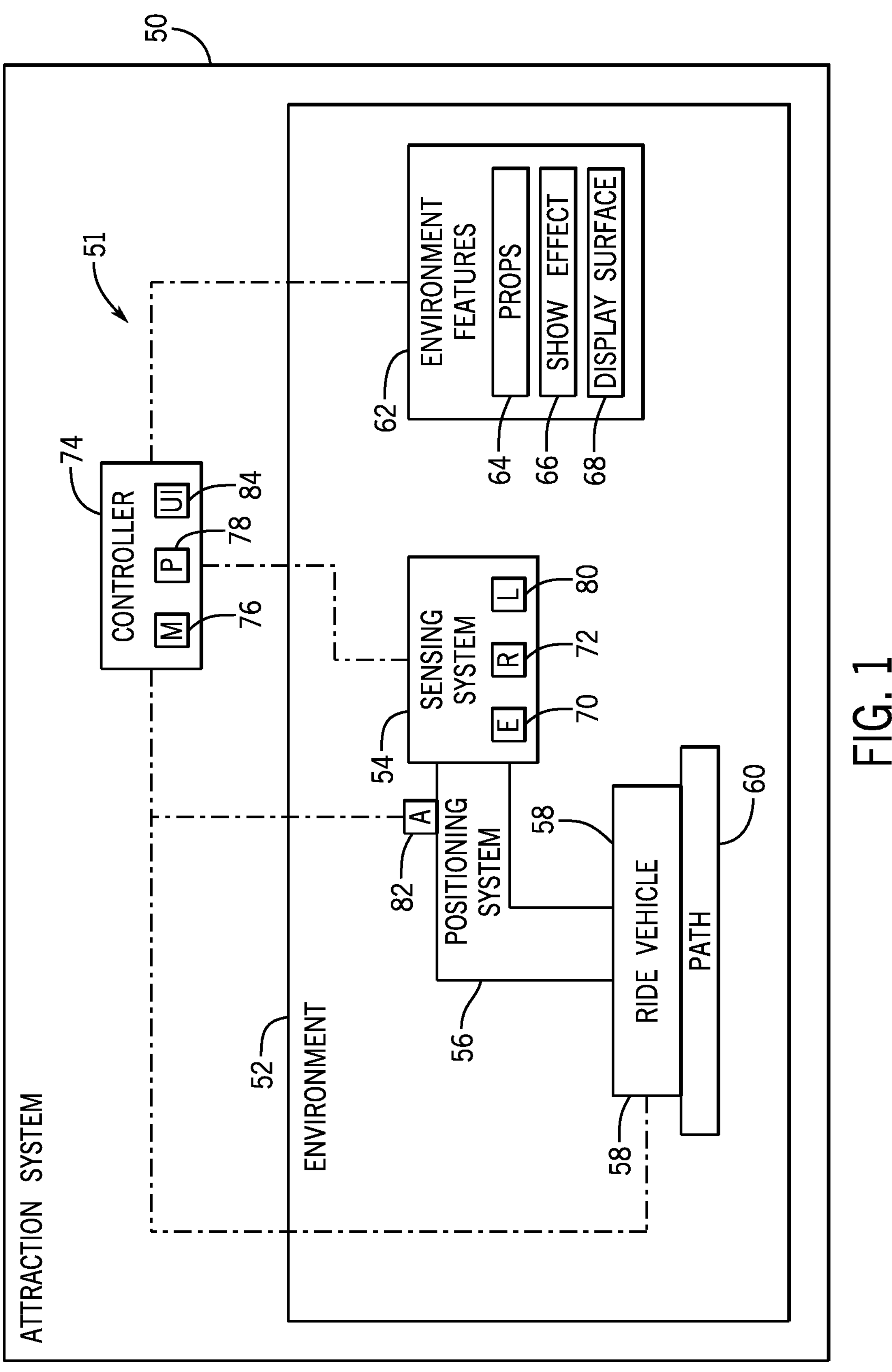
FIG. 1 is a schematic of an embodiment of an amusement park attraction having an environment and a mapping system configured to map the environment, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Embodiments of the present disclosure are directed to a system and method for mapping an environment of an attraction of an amusement park. For example, the attraction may include any of various amusement rides, such as a roller coaster, a dark ride, a water ride, an augmented reality ride or experience, and the like. The attraction may have various physical features, such as design props, set pieces, scenery, ride vehicles, ride tracks, and so forth, each entertaining guests of the attraction and providing a unique experience (e.g., an immersive environment) for the guests. Such features may be placed at target or predetermined locations within the environment of the attraction. In some embodiments, the features may be at particular locations to be viewed by the guests from a specific perspective. In additional or alternative embodiments, the features may be positioned at certain locations to enable the features to interact with one another as intended. For example, a projector may be placed relative to a display screen to project an image onto the display screen.

It may be beneficial to map the environment of the attraction to identify the locations of the features in order to verify that the features are properly positioned. As discussed herein, mapping the environment includes determining an appearance or arrangement of physical objects of the environment. Thus, users (e.g., operators of the attraction) may evaluate the environment to determine whether the physical features of the environment are placed at the target locations within the environment. However, mapping the environment may be difficult or tedious. For instance, it may be difficult to use a scanning device to capture sufficient scanning data to map the relevant areas of the environment. For example, capturing the scanning data may include placing the scanning device in various locations and/or positions within the environment. In some cases, the placement of the scanning device may not enable the scanning device to capture scanning data of usable quality (e.g., data in excess of a threshold resolution, at a threshold zoom, or at a threshold focus). Thus, the scanning data may not be accurate or may not be usable to map the environment accurately.

It is presently recognized that a system configured to scan and map the environment of the attraction system automatically may enable the location or position of the physical features of the attraction system to be determined and verified more easily. For example, the system may include a controller and a positioning system configured to position a scanning system (e.g., sensing system) to collect scanning data of various areas within the attraction system in order to map an environment of the attraction system. As used herein, scanning data may include three-dimensional (3D) images of the environment, and the scanning system includes a device configured to capture (e.g., remotely capture) the 3D image. For example, the scanning system may include a light detection and ranging (LIDAR) device, an infrared 3D scanner, a structured light scanner, a digital photogrammetry scanner, another suitable sensing system, or any combination thereof. The 3D images may include information regarding a geometry of physical objects in the environment, a location of physical objects in the environment, or any other suitable appearance or characteristic of physical objects in the environment. The controller may be configured to determine whether sufficient scanning data has been collected and may continue to instruct the positioning system to position the scanning system to collect scanning data until sufficient scanning data has been collected. The controller may then generate a map of the relevant areas of the environment based on the scanning data, and the map of the environment may be used to determine and/or verify the location of the physical features. In this manner, the system may enable the environment to be mapped more quickly and/or accurately.

Although the present disclosure primarily discusses capturing 3D images to scan an environment, in an additional or alternative embodiment, other types of images may be used to scan the environment. For instance, the scanning system may use two-dimensional (2D) images (e.g., captured by a camera). Furthermore, in addition to or as an alternative to mapping the environment, the scanning system may be used for capturing images of other features or objects, such as of guests and/or a component of the attraction system. In one embodiment, the positioning system may be an arm mounted to a ride vehicle of the attraction, and a camera may be mounted onto the arm. During operation of the attraction system, the arm may position (e.g., pan, tilt, rotate) the camera to focus on a certain element, such as on a particular guest positioned in the ride vehicle. The arm may also control operation of the camera, such as by adjusting the camera's zoom, filter, and the like. In an example, the arm may move the camera to various angles with respect to the guest, thereby capturing images having different perspectives of the guest. In another example, the ride vehicle may move during operation of the attraction system and may cause the arm to move the camera relative to the ride vehicle. In response, the arm may reposition the camera accordingly so as to capture a desirable image of the guest while the ride vehicle is moving.

Turning now to the drawings, FIG. 1 is a schematic view of an embodiment of an amusement park attraction system 50 having an environment 52 and a scanning and mapping system 51 configured to detect and map the environment 52. The environment 52 may generally include a part of the attraction system 50 in which guests may pass through, observe, or otherwise experience during their participation within the attraction system 50. For instance, the environment 52 may include a ride vehicle path, an enclosure, a stage, a queue line, any other suitable type of setting, or any combination thereof. The scanning and mapping system 51 includes a sensing system 54 (e.g., remote sensing system, scanning system) coupled to a positioning system 56. In the illustrated embodiment, the attraction system 50 also includes a ride vehicle 58 to which the positioning system 56 is coupled. In some embodiments, the ride vehicle 58 may be configured to travel along a path 60 within the environment 52 of the attraction system 50. For example, the path 60 may be a set route, such as a track (e.g., for a roller coaster ride). In another example, the path 60 may be an open area (e.g., for a bumper car ride) that the ride vehicle 58 may freely move around. In a further example, the path 60 may be a single location at which the ride vehicle 58 may remain substantially stationary (e.g., for a motion simulator ride). The positioning system 56 may be configured to move the sensing system 54 to a position within the environment 52. Furthermore, the ride vehicle 58 may move to various locations within the environment 52. As used herein, the position of the sensing system 54 refers to a placement of the sensing system 54 (e.g., by the positioning system 56) relative to the ride vehicle 58. The position may be within a range of a target position of the sensing system 54, such as within 1 millimeter (mm), within 5 mm, within 1 centimeter (cm), within 5 cm, within 10 cm, within another suitable range, and so forth, of the target position. Furthermore, the location of the sensing system 54 refers to a placement of the ride vehicle 58, and thus the sensing system 54 and the positioning system 56, along the path 60. The location may also be within a range of a target location, such as within 1 mm, within 5 mm, within 1 cm, within 5 cm, within 10 cm, within another suitable range, and so forth. Thus, the movement of both the positioning system 56 and the ride vehicle 58 may be used to move the sensing system 54 to a particular placement within the environment 52, thereby enabling the sensing system 54 to scan a particular area of the environment 52.

The environment 52 may include various types of environment features 62, such as props 64 (e.g., decorations, figures), show effects 66 (e.g., lighting, audio devices), and/or display surfaces 68 (e.g., a projector screen for projection mapping). During a scanning and mapping operation, the sensing system 54 may collect scanning data associated with the environment features 62 within the environment 52. The scanning data may indicate a physical appearance associated with each environment feature 62. In one example, the physical appearance may include or indicate the outline or geometry of the environment feature 62, such as whether the environment feature 62 is shaped or formed as desired. In another example, the physical appearance may include or indicate a location of the environment feature 62, such as whether the environment feature 62 is visible to the guests. In a further example, the physical appearance may include or indicate a placement of the environment feature 62 relative to another environment feature 62, so as to determine whether the environment features 62 may interact with one another as desired or intended. As such, the scanning data may be analyzed to determine whether the physical appearances of the environment features 62 are desirable, proper, or expected.

In an embodiment, the sensing system 54 may include an emitter 70 and a receiver 72 to collect scanning data associated with the physical objects of the environment 52, including the environment features 62, the ride vehicle 58, and any other physical component within the environment 52. Generally, the emitter 70 may output a transmitted signal (e.g., a laser light), which may reflect off the physical objects of the environment 52 as reflected signals, and the receiver 72 may receive the reflected signals. Based on the reflected signals, the sensing system 54 may determine an appearance of the physical objects. For example, the receiver 72 may receive reflected signals at various times, having various properties, and so forth, corresponding to the appearance of the physical objects. Thus, the sensing system 54 may use the detected parameters of each reflected signal to determine the appearance and/or characteristics of the physical objects within the environment, thereby facilitating the generation of 3D images of the environment 52. The emitter 70 may continuously output transmitted signals (e.g., with a pulsed laser light), the receiver 72 may continuously receive reflected signals, and as a result, the sensing system 54 may continuously generate 3D images of the environment 52, and the 3D images are associated with a particular area within the environment 52.

In an embodiment, the sensing system 54 is communicatively coupled to a controller 74 of the attraction system 50. The controller 74 may include a memory 76 and a processor 78. The memory 76 may include volatile memory, such as random access memory (RAM), and/or non-volatile memory, such as read-only memory (ROM), optical drives, hard disc drives, solid-state drives, or any other non-transitory computer-readable medium that includes instructions. The processor 78 may be configured to execute such instructions. For example, the processor 78 may include one or more application specific integrated circuits (ASICs), one or more field programmable gate arrays (FPGAs), one or more general purpose processors, or any combination thereof. The sensing system 54 may be configured to transmit sensor feedback to the controller 74 indicative of various sets of scanning data (e.g., 3D images) of the environment 52, and the controller 74 may evaluate the sets of scanning data and combine the sets of scanning data together to generate a full map of the environment 52.

To facilitate the generation of a full map of the environment 52, the sensing system 54 may also include a location sensor 80 configured to transmit a sensor feedback to the controller 74 indicative of a placement of the sensing system 54 (e.g., a coordinate position or location) within the environment 52. Thus, the controller 74 may use the sensor feedback transmitted by the location sensor 80 and scanning data received from the sensing system 54 to compare the sets of scanning data relative to one another to combine the sets of scanning data together. As an example, the controller 74 may identify common physical objects shared by certain sets of scanning data, determine the location of the shared physical objects within the environment 52, and determine the location of other physical objects relative to the shared physical objects to determine the placement of the other physical objects within the environment 52. Additionally or alternatively, the controller 74 may use the sensor feedback transmitted by the location sensor 80 to determine the placement of physical objects relative to the sensing system 54, thereby determining the placement of the physical objects within the environment 52.

The controller 74 may further be communicatively coupled to the positioning system 56 to move or adjust the sensing system 54 to various target positions. For instance, the controller 74 may adjust the positioning system 56 to move the sensing system 54 to capture target scanning data, such as data indicative of a particular area within the environment 52. In an embodiment, the positioning system 56 may include an actuator 82, and the controller 74 may transmit a control signal to the actuator 82 to move the positioning system 56, thereby moving the sensing system 54 (e.g., relative to the ride vehicle 58). As the ride vehicle 58 travels along the path 60 to change the location of the sensing system 54 within the environment 52, the controller 74 may instruct the actuator 82 to move the positioning system 56 (e.g., based on movement of the ride vehicle 58) and adjust the position of the sensing system 54 within the environment 52 to capture various scanning data for use in mapping the environment 52. In an alternative embodiment, in which the sensing system 54 is used for capturing 2D images (e.g., of a target object), the controller 74 may receive feedback indicative of various parameters, such as lighting (e.g., from a lighting sensor), positioning of the sensing system 54 (e.g., from a contact and/or a non-contact proximity sensor), positioning of the target object, a movement of the positioning system 56 (e.g., from a gyroscope sensor and/or an accelerometer), a velocity of the ride vehicle 58, a momentum of the ride vehicle 58, another suitable component, or any combination thereof. The controller 74 may then instruct the positioning system 56 to move the sensing system 54 based on the received feedback, such as to remain focused on the target object. In an embodiment, the controller 74 may be pre-programmed to move the sensing system 54 to particular positions or orientations during operation of the attraction system 50 so as to capture images of the target object.

Moreover, the controller 74 may be communicatively coupled to the environment features 62 and may be configured to operate and/or adjust the environment features 62 in a particular manner. In an embodiment, the controller 74 may be configured to adjust a positioning of the environment features 62 based on a generated map of the environment 52 and/or based on the scanning data collected by the sensing system 54. For instance, the controller 74 may adjust how a show effect 66 is directed or output (e.g., change how a light is projected) in response to a determination regarding how a placement of the show effect 66 has changed within the environment 52. In a certain embodiment, the controller 74 may autonomously control the ride vehicle 58 and/or the positioning system 56. That is, the controller 74 may automatically move the ride vehicle 58 and/or the positioning system 56 (e.g., independently of one another and/or dependently on one another), such as based on the target scanning data and/or the operation of the attraction system 50.

The controller 74 may also include a user interface 84 with which a user may interact. The user interface 84 may include a touch screen, a button, a track pad, a switch, a monitor, a keyboard, another suitable component, or any combination thereof, which the user may utilize to perform a desired operation. By way of example, the user may interact with the user interface 84 to adjust operation of the positioning system 56 and to place the sensing system 54 in a specific position. Additionally or alternatively, the user may interact with the user interface 84 to adjust operation of the ride vehicle 58 (e.g., along the path 60) to change the location of the sensing system 54 in the environment 52. In this manner, the ride vehicle 58 and the positioning system 56 may be manually controllable, and the controller 74 may enable the user to control the placement of the sensing system 54 to at least partially manually map the environment 52. In some embodiments, the user interface 84 may be utilized by the user to select a time when the sensing system 54 operates to collect scanning data, such as at a time when the ride vehicle 58 is in a particular location and/or when the positioning system 56 is in a particular position.

Figure 2:
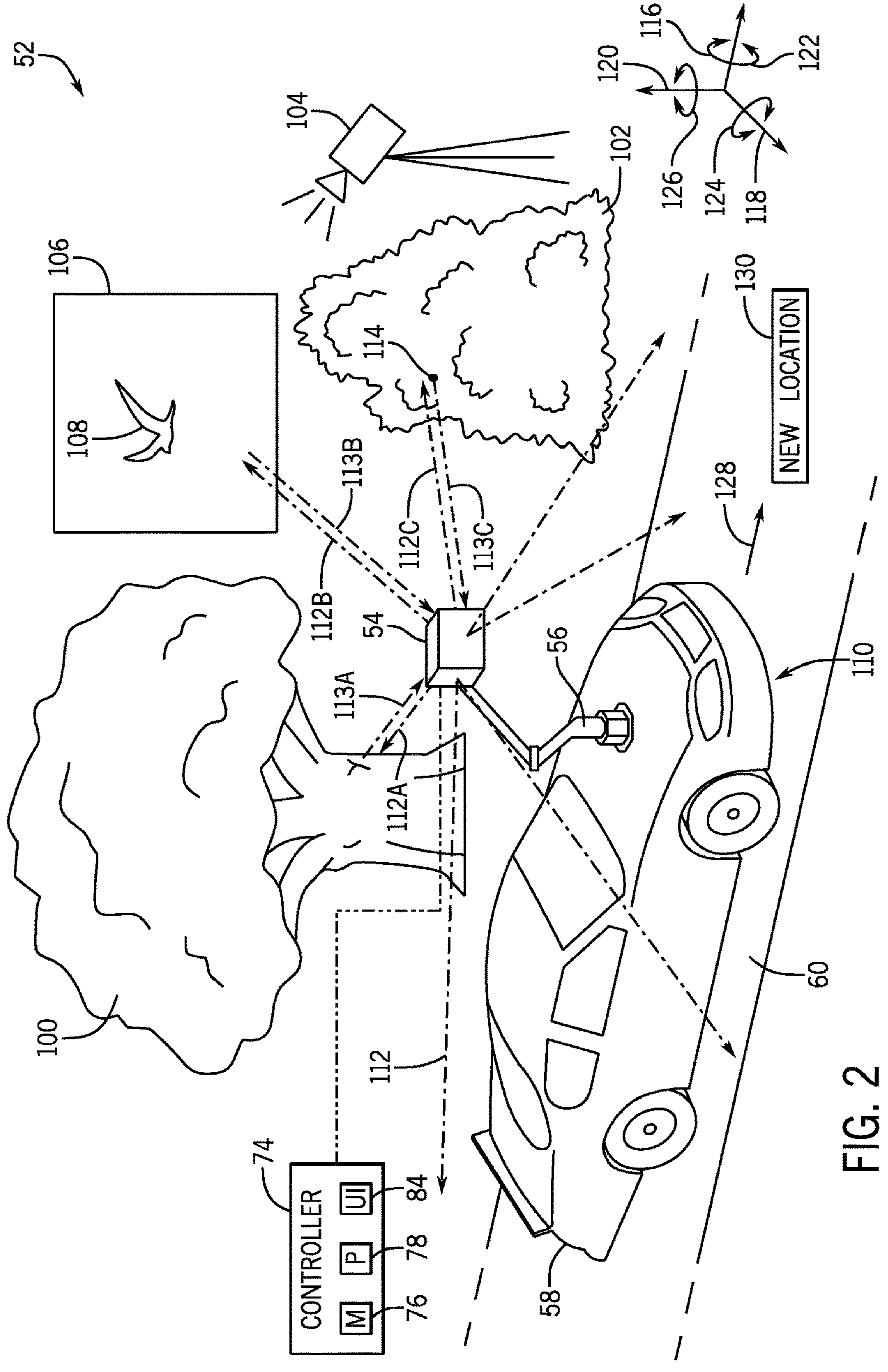
FIG. 2 is a perspective view of an embodiment of an environment of an amusement park attraction and a mapping system coupled to a ride vehicle, in accordance with an aspect of the present disclosure.

FIG. 2 is a perspective view of an embodiment of the environment 52 of the attraction system 50. In the illustrated embodiment, the ride vehicle 58 is a car that may travel along the path 60 (e.g., a street). Furthermore, the positioning system 56 is coupled to the ride vehicle 58, and the sensing system 54 is coupled to the positioning system 56. The environment 52 may include a variety of different environment features 62, such as a first prop 100 (e.g., a tree), a second prop 102 (e.g., a bush), a show effect 104 (e.g., a projector), and a display surface 106 onto which the show effect 104 may project an image 108.

In the illustrated embodiment, the ride vehicle 58 is at a first location 110 within the environment 52. At the first location 110, the positioning system 56 may position the sensing system 54 in a position or orientation that enables the sensing system 54 to capture scanning data associated with the first prop 100, the second prop 102, the show effect 104, and the display surface 106. For example, the sensing system 54 may output a variety of emitted signals 112 in and around the environment 52. Such emitted signals 112 may travel toward the first prop 100, the second prop 102, the display surface 106, among other areas of the environment 52, and the emitted signals 112 may deflect off the first prop 100, the second prop 102, and the display surface 106 as reflected signals 113 that are received by the sensing system 54. In particular, the sensing system 54 may receive a first reflected signal 113A reflected off the first prop 100 (e.g., as a result of a first emitted signal 112A), a second reflected signal 113B reflected off the display surface 106 (e.g., as a result of a second emitted signal 112B), and a third reflected signal 113C reflected off the second prop 102 (e.g., as a result of a third emitted signal 112C). It should be noted that the second prop 102 may be placed in a position or location that blocks emitted signals 112 from traveling from the sensing system 54 to the show effect 104. As a result, the sensing system 54 may not receive a reflected signal 113 deflected off the show effect 104. The sensing system 54 may compare characteristics of the reflected signals 113 with one another (e.g., a wavelength of each reflected signal 113, a time received of each reflected signal 113) to determine the appearance or orientation of the first prop 100, the second prop 102, the display surface 106, and other physical objects in the environment 52. In one implementation, for each individually emitted signal 112 and corresponding reflected signal 113, the sensing system 54 may generate a single virtual point in space representative of a point of a physical object in the environment 52 from which the emitted signal 112 was reflected. For example, the third reflected signal 113C may have reflected off a particular physical point 114 of the second prop 102. Based on the characteristics of the third reflected signal 113C, the sensing system 54 may generate a virtual point (e.g., for a 3D map) representing the physical point 114. The sensing system 54 may also generate virtual points for the other reflected signals 113, thereby generating a collection of points in space (e.g., a point cloud) to represent each physical object scanned in the environment 52.

The positioning system 56 may be configured to move the sensing system 54 to various positions, which may enable the sensing system 54 to receive additional reflected signals 113 to generate additional scanning data of the environment 52. In one implementation, the positioning system 56 may be configured to move the sensing system 54 along a longitudinal axis 116, a lateral axis 118, a vertical axis 120, or any combination thereof. For example, the positioning system 56 may raise the sensing system 54 along an axis parallel to the vertical axis 120, thereby providing the sensing system 54 with a vantage point to capture scanning data and avoid blockage of emitted signals 112 and/or reflected signals 113 by other physical objects (e.g., the path 60). Additionally or alternatively, the positioning system 56 may be configured to rotate the sensing system 54 in first rotational directions 122 about an axis parallel to the longitudinal axis 116, second rotational directions 124 about an axis parallel to the lateral axis 118, third rotational directions 126 about an axis parallel to the vertical axis 120, or any combination thereof. In an example, the sensing system 54 may be configured to emit signals 112 and receive reflected signals 113 about the longitudinal axis 116 and the lateral axis 118, but not the vertical axis 120, in a first orientation of the sensing system 54. As such, the sensing system 54 may not map the environment 52 along the vertical axis 120. For this reason, the positioning system 56 may rotate the sensing system 54 (e.g., in the first rotational directions 122 and/or the second rotational directions 124) to a second orientation to enable the sensing system 54 to map the environment 52 along the vertical axis 120. In this way, although the ride vehicle 58 may remain at the first location 110, the positioning system 56 may move the sensing system 54 to different positions or orientations and capture scanning data of various areas within the environment 52.

The ride vehicle 58 may be configured to move along the path 60 (e.g., in a direction 128) to a new location 130. At the new location 130, the sensing system 54 may scan and map the environment 52 at a different perspective than that of the first location 110. In this way, the sensing system 54 may receive reflected signals 113 that have reflected off different physical objects (e.g., a prop that was not scanned and mapped from the first location 110) and/or may receive reflected signals 113 that capture different scanning data. For example, at the new location 130, the sensing system 54 may output an emitted signal 112 that reflects off the second prop 102 (e.g., off the physical point 114) at a better angle as compared to at the first location 110. As such, the sensing system 54 may capture scanning data of the second prop 102 having better resolution or quality. Moreover, the controller 74 may combine the scanning data collected while the ride vehicle 58 was at the new location 130 with scanning data collected while the ride vehicle 58 was at the first location 110. For example, when the ride vehicle 58 is at the first location 110, the controller 74 may receive first scanning data and identify the location of the physical point 114 within the environment 52 by comparing the location of the physical point 114 relative to the location of the sensing system 54 within the environment 52. While the ride vehicle 58 is at the new location 130, the controller 74 may receive second scanning data to identify the location of the physical point 114 within the environment 52 again by comparing the location of the physical point 114 relative to the location of the sensing system 54 within the environment 52. The second scanning data may also include other physical points associated with other physical objects that may not have been scanned when the ride vehicle 58 was at the first location 110. Using the location of the physical point 114 as a reference point, the controller 74 may then identify the locations of the other physical points and may add such physical points (e.g., with virtual points representing the other physical points) to the first scanning data to combine the first and the second scanning data together. To this end, while the ride vehicle 58 is at the new location 130, the controller 74 may instruct the positioning system 56 to position the sensing system 54 to be able to capture scanning data of the physical point 114 accurately. The sensing system 54 may then be moved to other placements or orientations within the environment 52 at the new location 130 to capture additional scanning data to be used for mapping the environment 52.

The map of the environment 52 may be used to determine whether the first prop 100, the second prop 102, the show effect 104 and/or the display surface 106 are placed at desirable locations and/or in desirable orientations within the environment 52. For instance, based on the generated map of the environment 52, the user may determine that the show effect 104 is not visible to the guests when the ride vehicle 58 is at the first location 110, but that the show effect 104 may be visible to the guests when the ride vehicle 58 is at the new location 130. As such, the user may determine that the show effect 104 is to be moved such that the show effect 104 is also not visible to the guests when the ride vehicle 58 is at the new location 130, or at any other location within the environment 52. Additionally or alternatively, the user may determine how the placement of various features (e.g., environment features 62) may be changed relative to one another. By way of example, the show effect 104 may be placed such that the show effect 104 may project and move the image 108 from the display surface 106 toward the first prop 100. Thus, if the first prop 100 and/or the display surface 106 is moved (e.g., for maintenance), the user may determine whether the placement of the show effect 104 is also to be adjusted to maintain the desired projection of the image 108 from the display surface 106 toward the first prop 100.

Figure 3:
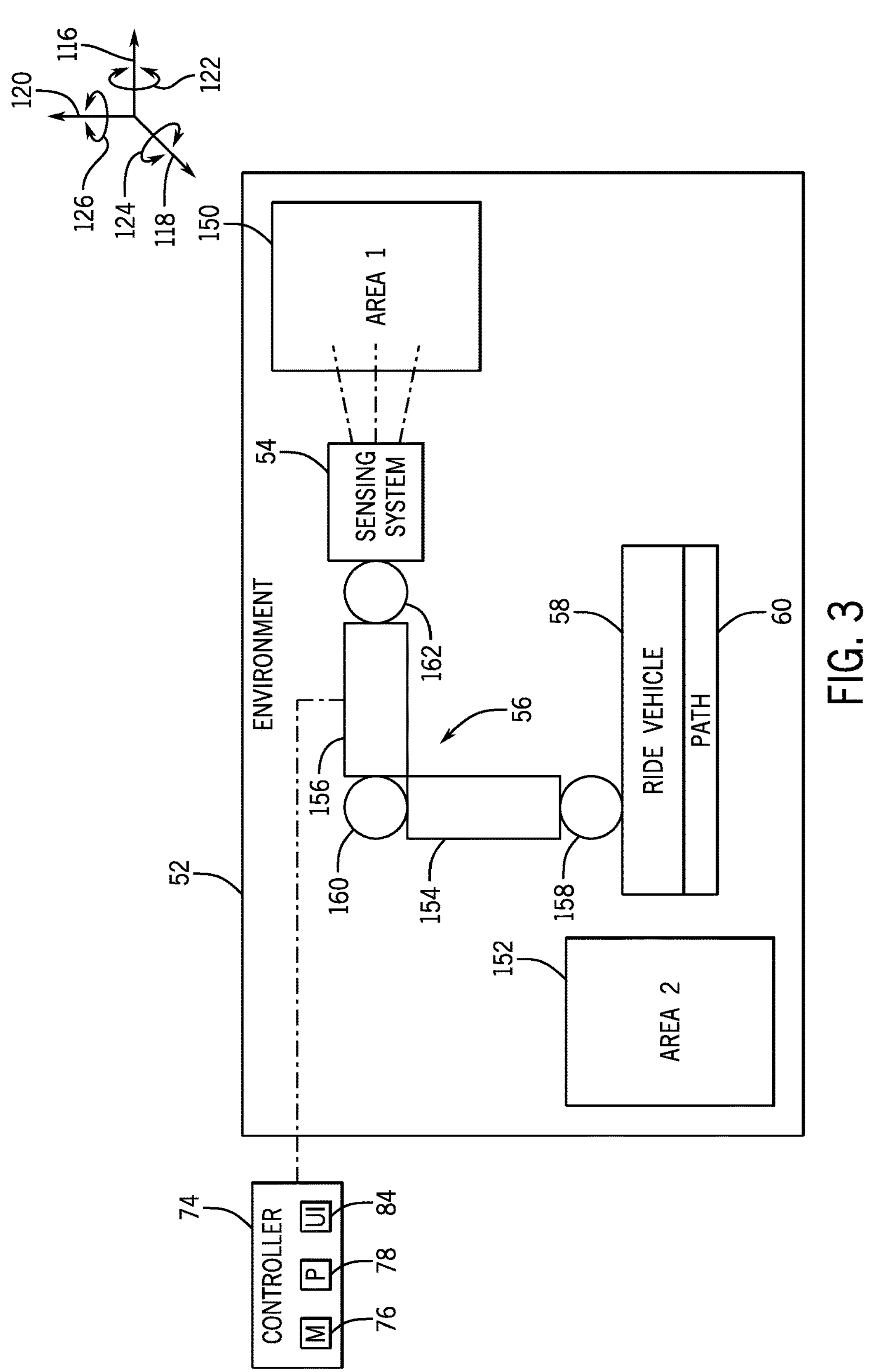
FIG. 3 is a schematic view of an embodiment of an environment of an amusement park attraction having a first area and a second area, in accordance with an aspect of the present disclosure.

FIG. 3 is a schematic view of an embodiment of the environment 52 having a first area 150 and a second area 152. In the illustrated embodiment, the sensing system 54 is coupled to the ride vehicle 58 via the positioning system 56, which has a first segment 154 and a second segment 156. As used herein, the segments of the positioning system 56 may include supports, such as rods, telescopic arms, another suitable support, or any combination thereof. The first segment 154 may be coupled to the ride vehicle 58 via a first joint 158 and to the second segment 156 via a second joint 160. Furthermore, the sensing system 54 may be coupled to the second segment 156 via a third joint 162. In an embodiment, the joints 158, 160, 162 may each be ball-and-socket type joints to enable the first segment 154 to rotate in each of the rotational directions 122, 124, 126 about the ride vehicle 58, to enable the second segment 156 to rotate in each of the rotational directions 122, 124, 126 about the first segment 154, and to enable the sensing system 54 to rotate in each of the rotational directions 122, 124, 126 about the second segment 156. As such, the positioning system 56 enables greater freedom of movement to move and position the sensing system 54 relative to the ride vehicle 58. Additionally or alternatively, the joints 158, 160, 162 may each be a different type of joint, such as a pivot joint, a hinge joint, another suitable joint, or any combination thereof. Moreover, although the illustrated positioning system 56 includes two segments 154, 156 and three joints 158, 160, 162, alternative embodiments of the positioning system 56 may include any suitable number of segments and joints, such as no segments or joints, between three and five segments and between three and five joints, more than five segments and more than five joints, and so forth. Further still, the segments 154, 156 and joints 158, 160, 162 may be securely and sturdily assembled to limit undesirable and/or unexpected movement of the positioning system 56 (e.g., caused by movement of the ride vehicle 58).

As described herein, the controller 74 may be configured to instruct the positioning system 56 to position the sensing system 54 to capture the target scanning data. For example, in the illustrated embodiment, the positioning system 56 positions the sensing system 54 to focus on capturing scanning data of the first area 150, rather than of the second area 152. However, at a different time, the controller 74 may instruct the positioning system 56 to focus on capturing scanning data of the second area 152, rather than of the first area 150. In response, the controller 74 may independently actuate the segments 154, 156 and/or the joints 158, 160, 162 to adjust the position of the sensing system 54 accordingly. In an embodiment, the controller 74 may be configured to actuate the positioning system 56 based on the target scanning data to be captured, previously-captured scanning data, a current location and position of the sensing system 54 within the environment 52, and/or a freedom of movement of the segments 154, 156 and/or the joints 158, 160, 162. That is, the controller 74 may determine a target position to which the sensing system 54 may be moved to capture the target scanning data, the controller 74 may determine the target scanning data based on previously-captured scanning data, the controller 74 may determine a current position of the sensing system 54 based on sensor feedback received from the location sensor 80 (FIG. 1), and the controller 74 may correspondingly determine how to actuate the positioning system 56 to move the sensing system 54 from a current position to the target position based on how the segments 154, 156 and the joints 158, 160, 162 may move relative to one another to change the position of the sensing system 54. In this way, the controller 74 may quickly and automatically instruct the positioning system 56 to move the sensing system 54 to capture different and desired scanning data of various areas within the environment 52 and to facilitate combining the captured scanning data.

Figure 4:
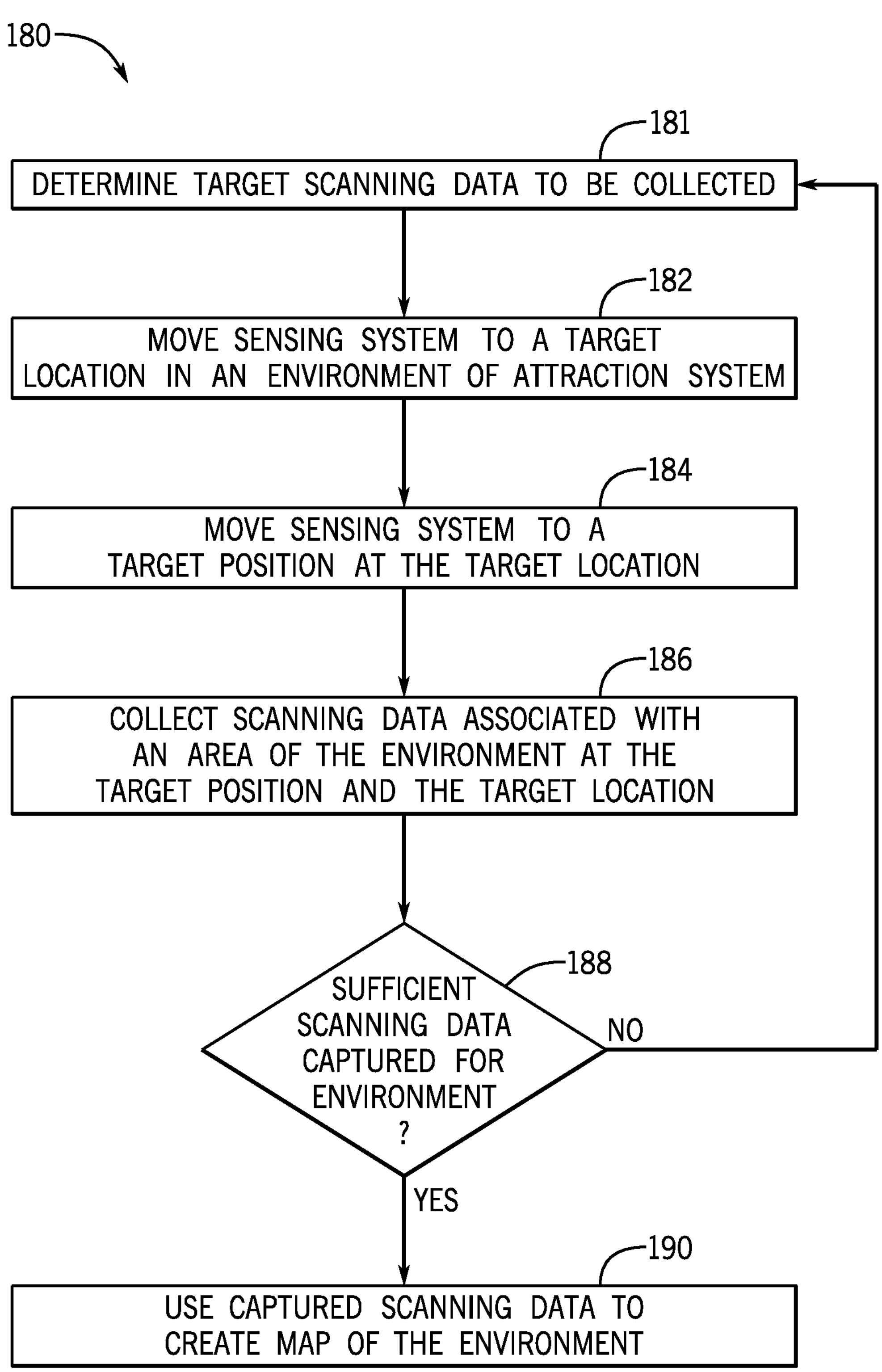
FIG. 4 is a flowchart of an embodiment of a method for creating a map of an environment of an amusement park attraction, in accordance with an aspect of the present disclosure.
Figure 5:
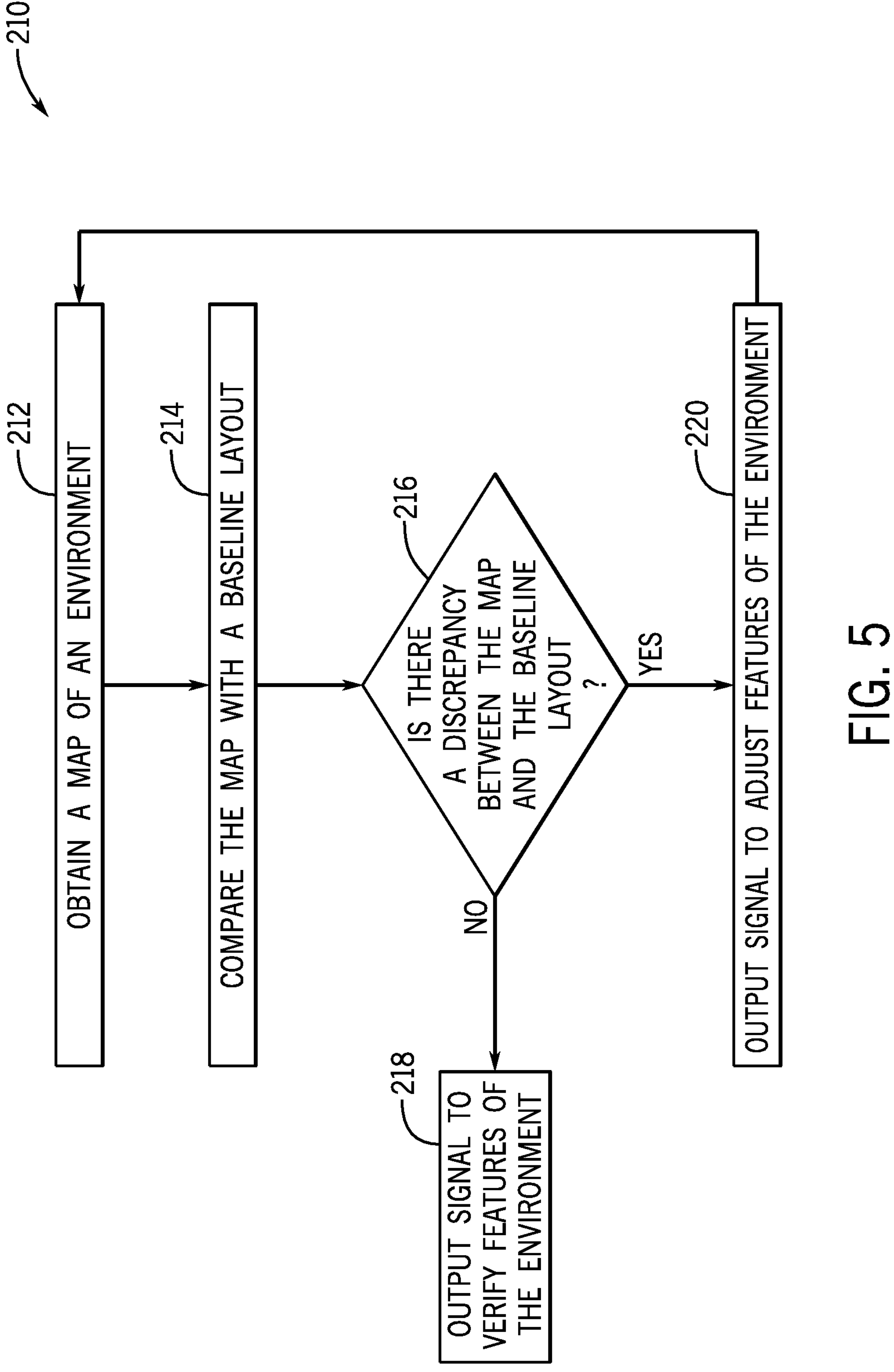
FIG. 5 is a flowchart of an embodiment of a method for analyzing a map of an environment to assess various environment features, in accordance with an aspect of the present disclosure.

FIGS. 4 and 5 are each flow charts illustrating a method or process for performing various actions based on scanning data captured by the sensing system 54. Each method may be performed by a controller, such as the controller 74. It should be noted that the steps of each method may be performed differently in other embodiments. For example, additional steps may be performed, or certain steps of each method may be modified, removed, or performed in a different order.

FIG. 4 is a flowchart of an embodiment of a method 180 for creating a map of the environment 52. At block 181, the controller determines target scanning data to be collected by the sensing system. In an embodiment, there may not be existing scanning data of the environment, and the target scanning data may be any initial scanning data that includes various physical objects of the environment. As an example, the controller may receive information (e.g., a virtual model) regarding a general layout of the environment, and the controller may determine the target scanning data to be captured based on the layout, such as based on where most of the physical objects are expected to be placed. As another example, at the start of the operation to map the environment, the sensing system may be instructed to move to a starting position and/or a starting location, and the controller may instruct the sensing system to capture an initial set of scanning data at the starting position and/or the starting location. In this case, the initial scanning data may be the target scanning data, which may also be used in a future scanning and mapping operation for the environment. In an additional or an alternative embodiment, the controller may receive existing scanning data and may determine target scanning data to be captured based on the existing scanning data, such as in response to a determination of missing, faulty, or otherwise inadequate data in the existing scanning data. In a further embodiment, the controller may receive a user input that includes the target scanning data to be captured by the sensing system.

At block 182, the controller outputs a control signal to the ride vehicle to move the sensing system to a target location within the environment of the attraction system based on the target scanning data determined at block 181. For example, the control signal may instruct the attraction system to operate a regular cycle of operation, in which the ride vehicle is configured to generally travel along the path, and the controller may determine when the ride vehicle is at a target location of the path. Additionally or alternatively, the control signal may directly instruct the ride vehicle to travel directly to the target location of the path.

At block 184, the controller outputs a control signal to the positioning system to move the sensing system to a target position while the ride vehicle is at the target location. As noted above, the controller may determine the target position based on the target scanning data, such as based on an area of the environment on which the sensing system is to focus. The controller may then determine a current position of the sensing system and may compare the current position of the sensing system with the target position of the sensing system. Based on the comparison between the current position and the target position, as well as a configuration or capability of the positioning system to move the sensing system, the controller outputs the control signal to the positioning system to move the sensing system accordingly.

At block 186, the controller outputs a control signal to the sensing system to capture scanning data associated with an area of the environment at the target position and at the target location of the sensing system. In one implementation, the control signal may instruct the sensing system to capture an individual set of scanning data at the target position and at the target location of the sensing system, thereby generating a single 3D scan or image of the area. In an alternative implementation, the control signal may instruct the sensing system to capture multiple scanning data at the target position and at the target location of the sensing system (e.g., with the sensing system at various orientations), such as by instructing the sensing system to emit a series of signals and receive a series of reflected signals, thereby generating multiple 3D scans of the area. The controller may compare the 3D scans with one another so as to create more accurate scanning data.

At block 188, the controller determines whether sufficient scanning data has been captured for the environment. For instance, the controller may determine whether scanning data has been captured for each relevant area within the environment. Additionally or alternatively, the controller may determine whether any parts of the captured scanning data are unsuitable (e.g., below a threshold resolution) and/or if there are any unexpected gaps in the scanning data. If the controller determines that the captured scanning data is not sufficient, then the steps at blocks 181-188 may be repeated. During the repeated steps, the controller may output a control signal to move the sensing system to a different target position and/or a different target location based on how the scanning data is determined to be insufficient. As an example, the controller may determine that scanning data of a particular area of the environment is incomplete. Therefore, the controller may identify target scanning data associated with the particular area and may output the control signal to move the sensing system to a corresponding target position and/or target location to capture the target scanning data associated with the particular area.

Furthermore, the controller may output a control signal to move the sensing system to capture additional scanning data in a manner that enables the additional scanning data to be easily combined with existing scanning data. In other words, the controller may identify subsequent target scanning data that may be combined with existing scanning data and may identify the target position and the target location associated with the subsequent target scanning data. For example, the controller may identify a first set of points of existing scanning data. The controller may then identify possible sets of points adjacent to the first set of points that have not already been collected and are of interest. For this reason, the controller may move the sensing system to a position and a location that enables the sensing system to capture additional scanning data that includes both the first set of points and the possible sets of points adjacent to the first set of points. As a result, the additional scanning data may be easily combined with the existing scanning data using the first set of points shared between the additional scanning data and the existing scanning data. In any case, steps 181-188 may be repeated for multiple iterations until the controller determines that sufficient scanning data has been collected. At each iteration, the controller may output the control signal to move the sensing system to capture additional scanning data.

At block 190, the controller determines that sufficient scanning data has been captured, and the controller uses the captured scanning data to create a map (e.g., a point cloud representation) of the environment, such as by combining multiple sets of captured scanning data together. As discussed herein, the controller may determine the placement of the sensing system within the environment and may identify the placement of the captured scanning data with respect to the placement of the sensing system to determine the overall placement of the captured scanning data within the environment. Additionally or alternatively, the controller may identify sets of points shared between different sets of scanning data and may determine the placement of the different sets of captured scanning data with respect to one another based on the placement of the shared points. The created map may include all collected points representative of various physical objects in the environment, in which the map of the environment includes the appearance or orientation of such physical objects in the environment. The controller may then store the created map (e.g., in the memory). The created map may be retrieved, such as by the controller, to compare the retrieved map with a subsequently generated map of the environment and/or by the user for reference to determine where the environment features are to be placed in the environment (e.g., when replacing certain environment features) and/or to verify that environment features are positioned in their expected or proper locations and orientations.

FIG. 5 is a flowchart of an embodiment of a method 210 for analyzing a map of the environment to determine and/or verify a status of various environment features. In an example, the controller may perform the method 210 after maintenance, adjustment, or another procedural operation is performed on the attraction system, so as to determine whether the procedural operation has affected any of the environment features of the environment. Additionally or alternatively, the controller may perform the method 210 to determine whether the actual placements of the environment features match with target or expected placements of the environment features. At block 212, the controller obtains the map (e.g., a point cloud representation) of the environment. For instance, the controller may perform the steps described with reference to the method 180 of FIG. 4 to create the map of the environment. Additionally or alternatively, the controller may receive or retrieve an already created map of the environment.

At block 214, the controller compares the obtained map of the environment with a baseline layout of the environment. As used herein, the baseline layout refers to a plan or map of the environment that is used as a reference point for comparing subsequently created maps of the environment. The baseline layout may include information associated with the physical objects of the environment, such as an appearance of each physical object at a certain point in time and/or a desired appearance of each physical object. For instance, the baseline layout may be a pre-existing map of the environment, a model created to represent the environment, or any other suitable baseline layout of the environment.

At block 216, the controller determines whether there is a discrepancy between the obtained map and the baseline layout. In an embodiment, the controller may compare the appearance of various physical objects in the obtained map with the appearance of various physical objects in the baseline layout. For example, the controller may compare a placement of one of the props in the obtained map with the place of the same prop in the baseline layout.

At block 218, the controller determines that there is no discrepancy between the obtained map and the baseline layout. As a result, the controller outputs a control signal to verify features of the environment. The control signal may include a notification indicating that the appearances of the environment features are as desired or expected. Thus, the user is informed that no further action may be taken to change the appearance of the environment feature. Moreover, the controller may not perform any further actions that would adjust the appearance of the environment features.

However, if the controller determines that there is a discrepancy between the obtained map and the baseline layout as performed in the step at block 216, the controller may output a control signal to adjust the environment features, as shown at block 220. In an e embodiment, the control signal may include a notification indicative that the appearance of certain environment features has changed or are not at the target placements within the environment. As such, the user may be informed of the discrepancy between the appearances of the environment features in the baseline layout and in the obtained map, and the user may determine to change the environment features accordingly. For example, the controller may determine that the show effect is positioned such that the show effect does not project the image onto the display surface. Thus, the notification may indicate to the user that the show effect and/or the display surface is to be re-positioned. The user may be able to utilize the baseline layout to determine where the show effect and/or the display surface is to be positioned to enable the show effect to project the image onto the display surface. Additionally or alternatively, the control signal may automatically adjust the environment features. For instance, the controller may automatically adjust the show effect and/or the display surface to enable the show effect to project the image onto the display surface.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park attraction mapping system, comprising:

a sensing system configured to be disposed within an environment of an amusement park attraction, the sensing system configured to capture scanning data of the environment, wherein the scanning data comprises virtual points representative of objects in the environment;

a positioning system coupled to the sensing system, wherein the positioning system is configured to move the sensing system within the environment; and a controller communicatively coupled to the sensing system and the positioning system, wherein the controller is configured to:

determine target scanning data to be captured by the sensing system;

instruct the positioning system to move the sensing system to target positions based on the target scanning data;

instruct the sensing system to capture the scanning data at the target positions;

combine the scanning data to create a data point cloud of the environment;

compare the data point cloud with a baseline layout of the environment;

output a signal based on the comparison of the data point cloud with the baseline layout, wherein the signal is associated with an adjustment of a feature of the environment;

determine additional target scanning data to be captured by the sensing system based on a determination that the scanning data is insufficient to create the data point cloud of the environment;

instruct the positioning system to move the sensing system to an additional target position based on the additional target scanning data; and instruct the sensing system to capture additional scanning data at the additional target position.

2. The amusement park attraction mapping system of claim 1, wherein the controller is configured to determine whether sufficient scanning data has been captured based on an amount of the scanning data, a resolution of the scanning data, a number of sets of the scanning data, or any combination thereof.

3. The amusement park attraction mapping system of claim 1, wherein the scanning data is associated with a first area of the environment, and the additional scanning data is associated with a second area of the environment separate from the first area.

4. The amusement park attraction mapping system of claim 1, wherein the scanning data and the additional scanning data each comprise a set of shared virtual points, and the controller is configured to combine the scanning data and the additional scanning data together to create the data point cloud of the environment based on the set of shared virtual points.

5. The amusement park attraction mapping system of claim 1, wherein the positioning system comprises at least two positioning arms coupled together via at least one joint, wherein the controller is configured to actuate each positioning arm to move the sensing system.

6. The amusement park attraction mapping system of claim 1, wherein the positioning system is coupled to a ride vehicle of the amusement park attraction, the controller is configured to instruct the positioning system to move the sensing system to the target positions relative to the ride vehicle, the controller is configured to instruct the ride vehicle to move to a target location within the environment such that the sensing system is moved to the target location, and the controller is configured to instruct the sensing system to capture the scanning data at a target position of the target positions corresponding to the target location.

7. The amusement park attraction mapping system of claim 1, wherein the sensing system comprises a light detection and ranging device, an infrared three-dimensional (3D) scanner, a structured light scanner, a digital photogrammetry scanner, or any combination thereof.

8. A controller for a scanning and mapping system of an amusement park, the controller comprising a tangible, non-transitory, computer-readable medium having computer-executable instructions stored thereon that, when executed, are configured to cause one or more processors to:

determine target scanning data of an environment of the amusement park to be captured, wherein the target scanning data comprises a target collection of virtual points;

instruct a ride vehicle of the amusement park to move a sensing system to target locations within the amusement park based on the target scanning data;

instruct a positioning system coupled to the ride vehicle to move the sensing system to target positions relative to the ride vehicle based on the target scanning data;

instruct the sensing system to capture scanning data at the target locations and the target positions;

combine the scanning data to create a data point cloud of the environment;

compare the data point cloud of the environment with a baseline layout of the environment to determine a discrepancy, wherein the discrepancy is indicative of an unexpected placement of a feature of the environment;

determine additional target scanning data to be captured by the sensing system based on a determination that the scanning data is insufficient to create the data point cloud of the environment;

instruct the positioning system to move the sensing system to an additional target position based on the additional target scanning data; and instruct the sensing system to capture additional scanning data at the additional target position.

9. The controller of claim 8, wherein the instructions, when executed, are configured to cause the one or more processors to instruct the ride vehicle to move along a path of an attraction of the amusement park within the environment.

10. The controller of claim 8, wherein the instructions, when executed, are configured to cause the one or more processors to instruct the positioning system to rotate the sensing system relative to the ride vehicle, translate the sensing system relative to the ride vehicle, or both.

11. The controller of claim 8, wherein the instructions, when executed, are configured to cause the one or more processors to receive a user input and to determine the target scanning data based on the user input.

12. The controller of claim 8, wherein the instructions, when executed, are configured to cause the one or more processors to receive previously-captured scanning data of the environment and to determine the target scanning data based on the previously-captured scanning data.

13. A theme park attraction system, comprising:

a ride vehicle;

a sensing system configured to capture scanning data of an environment of a theme park attraction, wherein the scanning data comprises data points representative of physical objects in the environment;

a positioning system coupling the sensing system to the ride vehicle, wherein the positioning system is configured to move the sensing system relative to the ride vehicle; and a controller communicatively coupled to the ride vehicle, the sensing system, and the positioning system, wherein the controller is configured to:

determine sets of target scanning data to be captured by the sensing system;

instruct the ride vehicle and the positioning system to move the sensing system to a plurality of placements within the environment, wherein each placement is associated with a set of target scanning data of the sets of target scanning data;

instruct the sensing system to capture sets of scanning data, wherein each set of scanning data of the sets of scanning data is associated with a respective placement of the plurality of placements;

combine the sets of scanning data with one another to create a data point cloud of the environment;

determine whether a discrepancy exists between the data point cloud of the environment and a baseline layout of the environment based on a comparison of the data point cloud of the environment and the baseline layout of the environment, wherein the discrepancy is indicative of an unexpected placement of a feature of the environment;

determine additional target scanning data to be captured by the sensing system based on a determination that the sets of scanning data are insufficient to create the data point cloud of the environment;

instruct the positioning system to move the sensing system to an additional placement based on the additional target scanning data; and instruct the sensing system to capture additional scanning data at the additional placement.

14. The theme park attraction system of claim 13, wherein the controller is configured to instruct the ride vehicle to move to a location within the environment and instruct the positioning system to move the sensing system to a position relative to the ride vehicle based on the location.

15. The theme park attraction system of claim 13, wherein the sensing system comprises a location sensor, and the controller is configured to:

receive respective sensor feedback from the location sensor to determine a respective location of the sensing system within the environment for each set of scanning data of the sets of scanning data;

associate each set of scanning data of the sets of scanning data with the respective location of the sensing system within the environment; and combine the sets of scanning data together based on the respective locations associated with each set of scanning data of the sets of scanning data.

16. The theme park attraction system of claim 13, wherein the controller is configured to output a signal related to an adjustment of the feature of the environment in response to identification of the discrepancy.

17. The theme park attraction system of claim 16, wherein the controller is configured to output the signal to send a notification to a user indicative of the adjustment of the feature, to adjust the feature automatically, or both.

18. The theme park attraction system of claim 13, wherein the baseline layout comprises a pre-existing map of the environment, a model of the environment, or both.

19. The theme park attraction system of claim 13, wherein the controller is configured to output a signal to verify placement or appearance of the feature of the environment in response to a determination that the discrepancy does not exist.

20. The amusement park attraction mapping system of claim 1, wherein the controller is configured to output an additional signal, based on the comparison of the data point cloud with the baseline layout, to verify placement or appearance of the feature of the environment.

* * * * *